US 11,104,449 B2

(12) United States Patent
Bilek et al.

(10) Patent No.: US 11,104,449 B2
(45) Date of Patent: Aug. 31, 2021

(54) SIGNIFICANT WEATHER ADVISORY SYSTEM

(71) Applicant: HONEYWELL INTERNATIONAL INC., Morris Plains, NJ (US)

(72) Inventors: Jan Bilek, Jihomoravsky kraj (CZ); Thea L. Feyereisen, Hudson, WI (US); Gang He, Morristown, NJ (US); Peter Chudy, Brno (CZ); Bryan Charles Weaver, Phoenix, AZ (US); Jakub Dluhos, Brno (CZ)

(73) Assignee: HONEYWELL INTERNTIONAL INC., Charlotte, NC (US)

( * ) Notice: Subject to any disclaimer, the term of this patent is extended or adjusted under 35 U.S.C. 154(b) by 290 days.

(21) Appl. No.: 16/250,010

(22) Filed: Jan. 17, 2019

(65) Prior Publication Data

US 2020/0231298 A1 Jul. 23, 2020

(51) Int. Cl.
*B64D 45/00* (2006.01)
*G01W 1/02* (2006.01)
(Continued)

(52) U.S. Cl.
CPC ............. *B64D 45/00* (2013.01); *B64D 43/00* (2013.01); *G01C 23/00* (2013.01); *G01W 1/02* (2013.01);
(Continued)

(58) Field of Classification Search
CPC .. G08G 5/0021; G08G 5/0047; G08G 5/0052; G08G 5/0091; G09G 2380/12; G09G 5/37; G09G 2358/00; G09G 2354/00; G01W 1/02; G01W 2001/003; B64D 2045/0085; B64D 45/00; B64D 43/00; G06F 3/14; G06F 3/147; G07C 5/08; G01C 23/00
(Continued)

(56) References Cited

U.S. PATENT DOCUMENTS 6,501,392 B2  12/2002  Gremmert et al.
7,417,579 B1   8/2008  Woodell
(Continued)

FOREIGN PATENT DOCUMENTS

CN    109835490 A   *  6/2019   ........... G08G 5/0021
WO    WO-2018071377 A1 *  4/2018   ........... G08G 5/0091
WO    WO-2020242447 A1 * 12/2020   ............... G08G 5/00

*Primary Examiner* — Atul Trivedi
(74) *Attorney, Agent, or Firm* — Lorenz & Kopf, LLP

(57) ABSTRACT

A significant weather advisory system for an aircraft is disclosed. The system is configured to identify, from strategic weather data, current significant weather events from weather impacted areas projected to be intersected by a geographical corridor around a projected flight path and projected to occur during determined time intervals during which the airborne vehicle is expected to pass through the weather impacted areas; compare the current significant weather events to previously identified significant weather events and detect significant changes between the current significant weather events and the previously identified significant weather events; and generate a notification for display to the flight crew via an onboard notification system that identifies the detected significant change when a significant change is detected.

20 Claims, 7 Drawing Sheets

(51) Int. Cl.
*G08G 5/00* (2006.01)
*G07C 5/08* (2006.01)
*G01C 23/00* (2006.01)
*B64D 43/00* (2006.01)
*G06F 3/14* (2006.01)
*G01W 1/00* (2006.01)
*G09G 5/37* (2006.01)

(52) U.S. Cl.
CPC .............. *G07C 5/08* (2013.01); *G08G 5/0047* (2013.01); *G08G 5/0091* (2013.01); *B64D 2045/0085* (2013.01); *G01W 2001/003* (2013.01); *G06F 3/14* (2013.01); *G09G 5/37* (2013.01); *G09G 2354/00* (2013.01); *G09G 2380/12* (2013.01)

(58) Field of Classification Search
USPC .......................................................... 701/14
See application file for complete search history.

(56) References Cited

U.S. PATENT DOCUMENTS

| | | | |
|---|---|---|---|
| 7,656,343 B1 | 2/2010 | Hagen et al. | |
| 7,664,601 B2 | 2/2010 | Daly, Jr. | |
| 9,153,137 B2 * | 10/2015 | Hankers | G01W 1/00 |
| 9,599,707 B1 * | 3/2017 | Kronfeld | G01S 13/867 |
| 9,652,888 B1 * | 5/2017 | Johnson | G06T 17/05 |
| 9,689,984 B1 * | 6/2017 | Breiholz | G01S 13/865 |
| 9,810,770 B1 * | 11/2017 | Weichbrod | G01S 7/10 |
| 9,997,080 B1 * | 6/2018 | Chambers | G08G 5/0034 |
| 10,037,124 B2 * | 7/2018 | Khatwa | G06F 3/04842 |
| 10,388,171 B2 * | 8/2019 | Liberman | B64D 45/04 |
| 2014/0331161 A1 | 11/2014 | Venkataswamy et al. | |
| 2016/0209214 A1 * | 7/2016 | Vasek | G08G 5/0021 |
| 2016/0229554 A1 * | 8/2016 | Kawalkar | G01C 23/00 |
| 2016/0266249 A1 * | 9/2016 | Kauffman | G01S 13/95 |
| 2017/0011635 A1 * | 1/2017 | Whitlow | G08G 5/0052 |
| 2017/0082745 A1 * | 3/2017 | Kronfeld | G01S 7/24 |
| 2017/0183105 A1 * | 6/2017 | Fournier | G08G 5/0052 |
| 2017/0186203 A1 * | 6/2017 | Fournier | G08G 5/0091 |
| 2017/0272148 A1 * | 9/2017 | Wang | G01S 13/953 |
| 2017/0363774 A1 * | 12/2017 | Jiang | G08G 1/0967 |
| 2018/0031698 A1 * | 2/2018 | Wang | G01S 13/87 |
| 2018/0047294 A1 * | 2/2018 | Esposito | G08G 5/0091 |
| 2018/0074167 A1 * | 3/2018 | Bilek | G01S 13/953 |
| 2018/0074189 A1 * | 3/2018 | Khatwa | G01C 21/3691 |
| 2018/0105284 A1 * | 4/2018 | B. | G01S 7/51 |
| 2018/0107227 A1 * | 4/2018 | Sharma | G01C 21/20 |
| 2018/0155052 A1 * | 6/2018 | Lacroix | H04B 7/18506 |
| 2018/0232097 A1 * | 8/2018 | Kneuper | G08G 5/0034 |
| 2018/0238996 A1 * | 8/2018 | Gurusamy | G01S 7/062 |
| 2018/0247547 A1 * | 8/2018 | Karunakar | G08G 5/0013 |
| 2018/0292826 A1 * | 10/2018 | DeFelice | G08G 5/0091 |
| 2019/0334614 A1 * | 10/2019 | Mohideen | G08G 5/0026 |
| 2019/0340940 A1 * | 11/2019 | Elkabetz | G01W 1/02 |
| 2020/0133611 A1 * | 4/2020 | Feyereisen | G01C 23/00 |
| 2020/0225831 A1 * | 7/2020 | Saptharishi | G06F 3/04817 |
| 2020/0231298 A1 * | 7/2020 | Bilek | G06F 3/147 |
| 2020/0279496 A1 * | 9/2020 | Schupp | G08G 5/045 |
| 2020/0394985 A1 * | 12/2020 | He | G06T 7/70 |
| 2020/0399343 A1 * | 12/2020 | Chaparro Riggers | C07K 16/2803 |

* cited by examiner

SIGNIFICANT WEATHER ADVISORY SYSTEM

TECHNICAL FIELD

The present invention generally relates to systems for receiving weather data on an airborne vehicle, and more particularly relates to systems and methods for automatically providing notifications to flight crew regarding significant weather events.

BACKGROUND

An increasing number of strategic weather products is available for use by flight crew. The abundance of strategic weather products is creating an overly complex information set that needs to be reviewed and understood by the flight crew. This can lead to increased flight crew workload and an increased probability that flight crew may reach an incorrect conclusion when reviewing weather data.

Hence, it is desirable to provide systems and methods for assisting the flight crew with the review of strategic weather data. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A significant weather advisory system for an airborne vehicle is disclosed. The system includes one or more processors configured by programming instructions on non-transient computer readable media. The system is configured to identify, from strategic weather data, current significant weather events from weather impacted areas projected to be intersected by a geographical corridor around a projected flight path and projected to occur during determined time intervals during which the airborne vehicle is expected to pass through the weather impacted areas; and generate a notification for display to the flight crew via an onboard notification system that notifies the flight crew of an identified significant weather event.

A processor implemented method in an aircraft for generating weather advisories for a flight crew is disclosed. The method includes: identifying, with a processor from strategic weather data, current significant weather events from weather impacted areas projected to be intersected by a geographical corridor around a projected flight path and projected to occur during determined time intervals during which the aircraft is expected to pass through the weather impacted areas; and generating, with the processor, a notification for display to the flight crew via an onboard notification system that notifies the flight crew of an identified significant weather event.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1A:
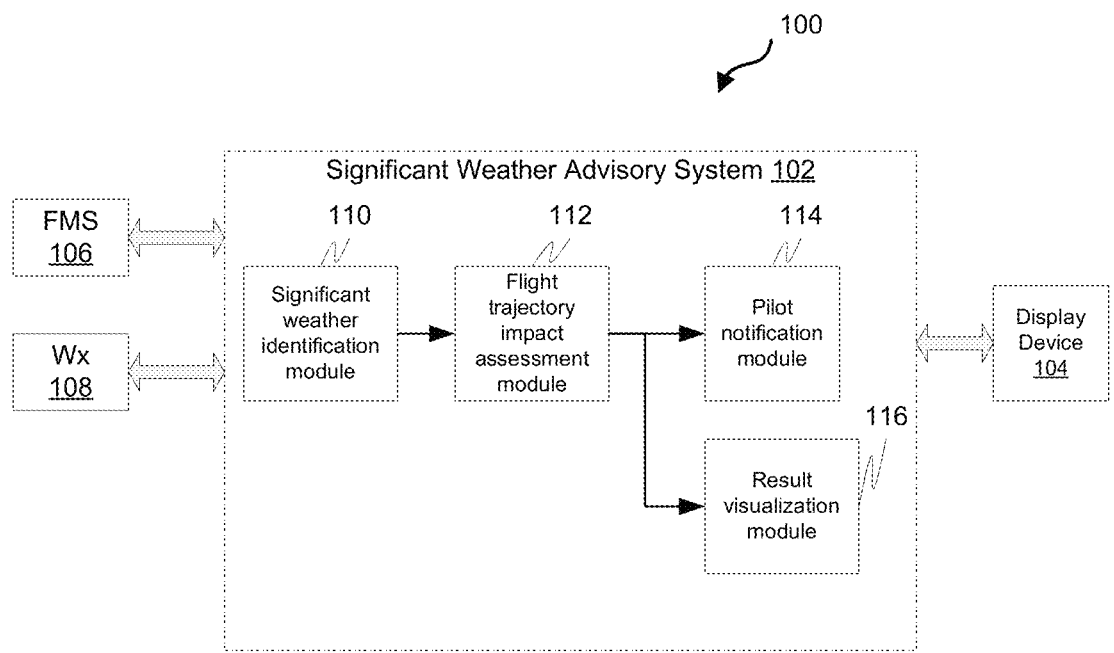
FIG. 1A is a block diagram depicting example aircraft systems in an aircraft, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for assisting flight crew with the review of strategic weather data by providing the flight crew with summary information regarding the most significant properties of the overall weather situation and a way for the flight crew to access and efficiently review related weather details. The apparatus, systems, techniques and articles provided herein can provide a system that can identify significant weather, assess the impact of the significant weather on flight trajectory, provide a notification to the flight crew regarding the significant weather, and provide a graphical visualization of the significant weather's impact on flight trajectory.

FIG. 1A is a block diagram depicting example aircraft systems 100 in an aircraft. The example aircraft systems 100 include a significant weather advisory system 102, a display device 104 such as a multi-function control and display unit or a touchscreen control system, avionics systems 106, and a weather/framework service interface 108. The avionics systems 106 may include a variety of flight deck systems such as a flight management system (FMS), a flight director (FD) system, a communication management function (CMF), a maintenance system, communication/navigation systems, radio systems, central maintenance computers (CMCs), forward display control systems, and other avionics systems, to list but a few examples.

The weather/framework service interface 108 is configured to retrieve real-time flight condition data for use during flight or mission planning from external weather/framework service provider(s). The flight condition data may include information regarding obstacles, atmospheric conditions, wind, air traffic, schedules, and others that the flight crew may encounter or need to know about during flight. External weather service provider(s) may include any service provider (e.g., Sirius XM or GoDirect Weather) that offers a strategic weather solution that can provide weather data for integrated avionics products (e.g., Uplink Weather for INAV or GoDirect Weather for INAV) and/or EFB applications (e.g., Flight Bag Pro or Weather Information Service).

The example significant weather advisory system 102 is configured to analyze weather data (e.g., atmospheric conditions, wind, etc.) received from weather/framework service provider(s), provide the flight crew with summary information highlighting the most significant weather conditions that may impact the aircraft during flight, and provide an efficient way for the flight crew to focus in on specific weather details. The example significant weather advisory system 102 includes a significant weather identification module 110, a flight trajectory impact assessment module 112, a pilot notification module 114, and a result visualization module 116.

The significant weather advisory system 102 includes a controller that is configured to implement the significant weather identification module 110, flight trajectory impact assessment module 112, pilot notification module 114, and result visualization module 116. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The significant weather identification module 110 is configured to review strategic weather data received on the aircraft, for example via the weather/framework service interface 106, and identify current significant weather events from strategic weather data. In some examples, the significant weather identification module 110 may be configured to review tactical weather data from tactical weather sources, such as onboard radar, and identify current significant weather events from tactical weather data. In one example, significant weather events are the subset of available weather events that can potentially have a significant impact on flight and require the flight crew's active awareness. Table 1 below lists example weather conditions that may be considered significant weather events.

TABLE 1

| Phenomenon | Level | Condition |
|---|---|---|
| Icing | Severe | Always |
| | Heavy | Always |
| | Moderate | In case of engine failure or de-icing system failure |
| Turbulence | High potential | Always |
| | Moderate potential | Always |
| | Low potential | Configurable |
| Thunderstorm | Red reflectivity | Minimal distance from flight plan required |
| | Amber reflectivity | Minimal distance from flight plan required |
| | PIREP or SIGMET | Always |
| | Lightning | For areas without radar coverage |
| Temperature | Any | ISA deviation over +/−15° C. or over |
| METAR | Departure and destination airport | Conditions not allowing take off or planned landing type |

To identify current significant weather events, the example significant weather identification module 110 is configured to apply fixed, predetermined criteria to automatically identify significant weather data (for example high potential turbulence may always be considered a significant weather event); apply pre-designated flight crew preferences to automatically identify significant weather data (for example the flight crew may designate low potential turbulence as being a significant weather event); identify, based on the status of one or more aircraft systems, significant weather data that is significant because of the status of the one or more aircraft systems (for example in the presence of a de-icing system failure, moderate icing may be considered as a significant weather event); identify significant weather data that is significant because it impacts projected take-off conditions (for example METAR data, such as high winds, that indicates that conditions do not allow for takeoff at a scheduled runway can be considered as a significant weather event); and identify significant weather data that is significant because it impacts projected landing conditions (for example METAR data, such as fog or visibility conditions, that indicates that conditions do not allow for a planned landing type at a schedule airport can be considered as a significant weather event). The significant weather identification module 104 is also configured to compare the current significant weather events to previously identified significant weather events and detect significant changes between the current significant weather events and the previously identified significant weather events, The flight trajectory impact assessment module 112 is configured to determine whether current significant weather events has the potential to impact the aircraft during its projected flight path. To determine the potential impact to the aircraft's flight path, the example flight trajectory impact assessment module 112 is configured to filter out, from the current significant weather events, potentially significant weather events from a weather impacted area that will not be intersected by a geographical corridor around the projected flight path and filter out, from the current significant weather events, potentially significant weather events that will not exist within the time frame during which the aircraft is planned to pass through the weather impacted area.

The assessment of impact on flight trajectory is performed by the example flight trajectory impact assessment module 112 every time new weather data set is received, for example from the weather/framework service interface 106. To perform the assessment, the example flight trajectory impact assessment module 112 considers the strategic weather data set, flight plan (e.g., from flight deck equipment such as the FMS), aircraft systems status (e.g., from flight deck equipment such as the CMCs), and configurable flight crew's preferences for significant weather advisory that are set in advance (e.g., before flight) by the flight crew. In some examples, the example flight trajectory impact assessment module 112 may also consider the tactical weather data.

Figure 2:
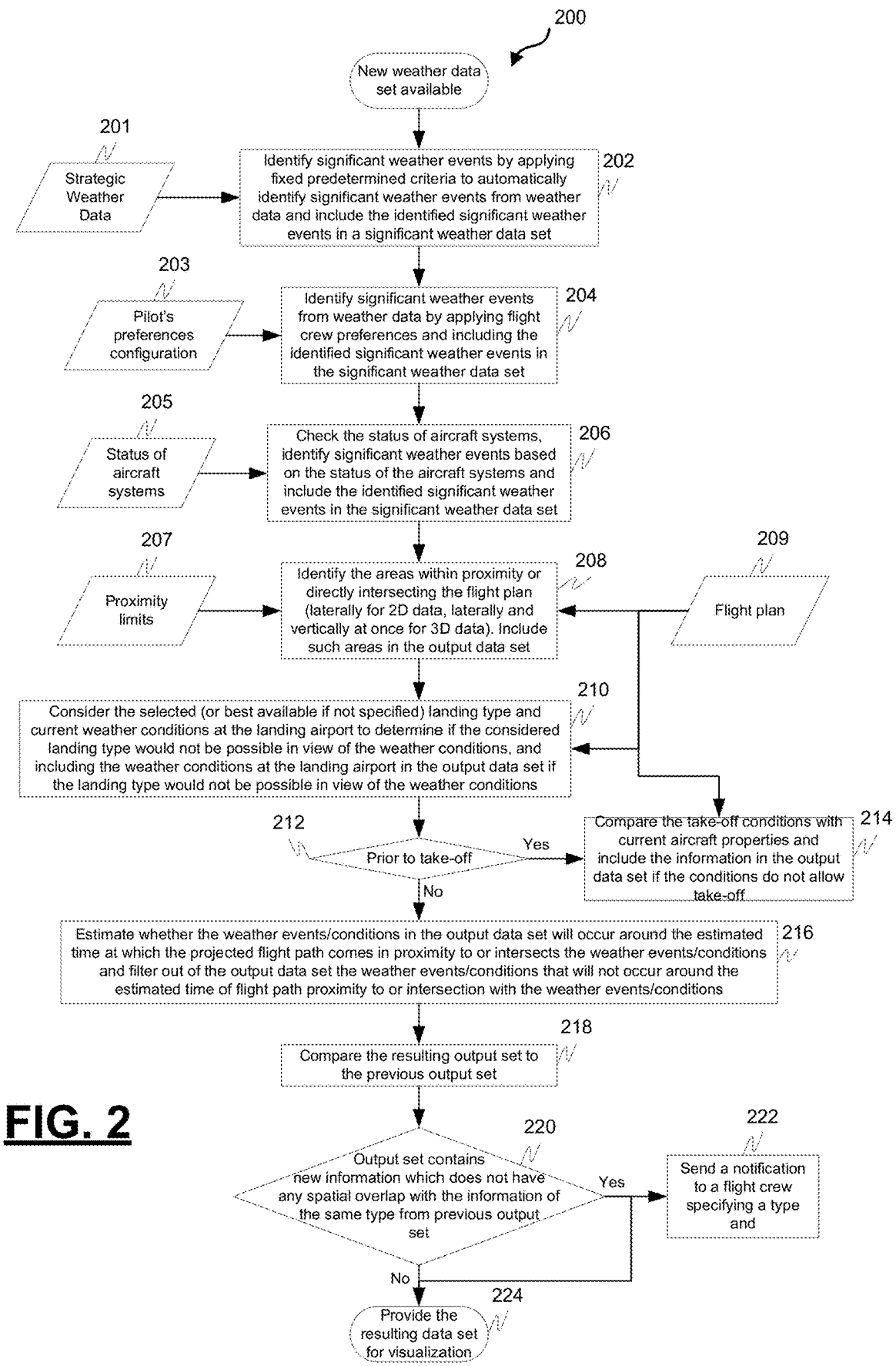
FIG. 2 is a process flow chart depicting an example process 200 for identifying significant weather events and assessing the impact of the identified significant weather events on flight trajectory, in accordance with some embodiments.

FIG. 2 is a process flow chart depicting an example process 200 for identifying significant weather events and assessing the impact of the identified significant weather events on flight trajectory. The process 200 includes identifying significant weather events in a number of different stages, each of which may be performed in parallel or in varying orders. The process 200 includes identifying significant weather events by applying fixed predetermined criteria to automatically identify significant weather events from strategic weather data 201 (e.g., atmospheric conditions, wind, etc. received from weather/framework service provider(s)) and including the identified significant weather events in a significant weather data set (operation 202). The process 200 also includes identifying significant weather events from weather data by applying flight crew preferences 203 (e.g., that are identified pre-flight and stored in a configuration file) and including the identified significant weather events in the significant weather data set (operation 204). The process 200 further includes checking the status of aircraft systems 205, identifying significant weather events based on the status of the aircraft systems and including the identified significant weather events in the significant weather data set (operation 206).

To assess the impact of the identified significant weather events on flight trajectory, the process 200 includes identifying areas experiencing the identified significant weather events in the significant weather data set that are within predetermined proximity limits 207 from the projected flight path from the flight plan 209 or directly intersect the projected flight path from the flight plan 209 (e.g., laterally for 2D data, laterally and vertically at once for 3D data) and including the areas in an output data set (operation 208).

The process 200 further includes considering the selected (or best available if not specified) landing type (from the flight plan 209) and current weather conditions at the landing airport to determine if the selected (or best available if not specified) landing type would not be possible in view of the current weather conditions, and including the current weather conditions at the landing airport in the output data set if the landing type would not be possible in view of the current weather conditions (operation 210).

When the process 200 is executing prior to take-off (yes at decision 212), the process 200 includes comparing the take-off weather conditions with current aircraft properties (e.g., the maximum allowed temperature for flight) and including the take-off weather conditions in the output data set if the weather conditions do not allow take-off (operation 214).

When the process 200 is not executing prior to take-off (no at decision 212), the process 200 includes estimating whether the weather events/conditions in the output data set will occur around the estimated time at which the projected flight path comes in proximity to or intersects the weather events/conditions and filtering out of the output data set the weather events/conditions that will not occur around the estimated time of flight path proximity to or intersection with the weather events/conditions (operation 216) The flight leg times from FMS flight plan information may be used for determining whether the weather events/conditions in the output data set will occur around the estimated time at which the projected flight path comes in proximity to or intersects the weather events/conditions.

The process 200 includes comparing the resulting output set from the current iteration of process 200 to the output set from the previous iteration of the process 200 (operation 218). When the output set from the current iteration contains new weather event(s)/condition(s) that do not have any spatial overlap with the weather event(s)/condition(s) of the same type from the prior output set (yes at decision 220), the process 200 includes sending a notification to the flight crew identifying the type of the new weather event(s)/condition(s) (operation 222) and subsequently or in parallel providing the output data set for visualization (operation 224). When the output data set from the current iteration does not contain new weather event(s)/condition(s) (no at decision 220), the process 200 includes providing the output data set for visualization (operation 224).

In another example, an example process for identifying significant weather events and assessing the impact of the identified significant weather events on flight trajectory includes creating a significant weather information data set by processing newly received weather data. Creating a significant weather information data set by processing newly received weather data involves including in the significant weather information data set: (i) the subset of received data that always qualifies as significant weather without any further conditions, (ii) the subset of received data that qualifies as significant weather based on pre-identified flight crew preferences (e.g., stored in a configuration file); and (iii) the subset of received data that qualifies as significant weather based on the current state of various aircraft systems.

From the significant weather information data set, the example process includes: (i) determining the location at which the significant weather intersects or is within proximity limits to a projected flight path from the flight plan (both laterally or vertically); (ii) determining if the conditions at departure and arrival airports allow take-off and landing; and (iii) including in an output data set (a) the significant weather information that intersects or is within proximity limits to a projected flight path or (b) information regarding the conditions at departure and arrival airports that prevent take-off and landing, but only if the significant weather information is projected to be valid around the estimated time at which the projected flight path comes in proximity to or intersects the weather events/conditions. The example process further includes comparing the output data set with the prior output data set to determine if the output dataset contains any new significant weather information and providing a notification for the flight crew if new significant weather information is available.

Notification to the flight crew is a possible output of the assessment as described above. Referring back to FIG. 1A, the pilot notification module 114 is configured to generate a notification for display to the flight crew via an onboard notification system that identifies the detected significant change in weather when a significant change in weather is detected. The notification may include the type of weather phenomenon occurrence, level of the weather phenomenon occurrence, estimated time to reach the affected location, and a selectable link for providing more detailed information regarding the weather phenomenon occurrence when selected.

The result visualization module 116 is configured to generate a visualization via a graphic widget for display on a moving map on a navigational display that identifies an area on a projected flight path where a current significant weather event is projected to occur. The visualization enhances the depiction of the flight trajectory and can consist of colored outlines (or bars) along the flight segments affected by the significant weather. The depiction can match the color philosophy of weather information (e.g. light blue color can be used for depiction of icing, orange for turbulence, etc.)

The visualization can provide further differentiation regarding whether the weather phenomenon affecting the flight trajectory is directly intersecting or only in the proximity of the trajectory. As an example, when intersecting significant weather, the visualization can show the flight path outlined from both sides, and when proximate to significant weather, the visualization can show the flight path outlined only from the side adjacent to the proximate significant weather. When proximate significant weather is present on both sides, the outline can relate to the closer occurrence. When two or more significant weather phenomena overlap, the visualization can stack outlines next to each other based on the priority of each of the weather phenomena.

Figure 1B:
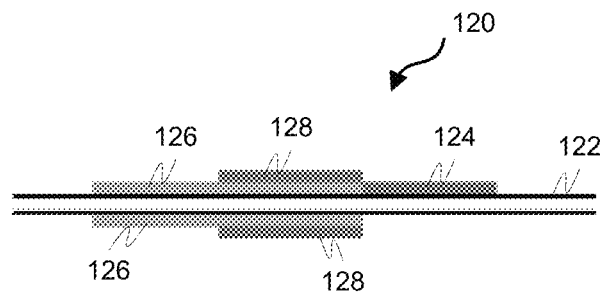
FIG. 1B is a diagram depicting an example graphic widget that may be displayed on a moving map on a navigational display that identifies an area on a projected flight path where current significant weather events are projected to occur, in accordance with some embodiments.

FIG. 1B is a diagram depicting an example graphic widget 120 that may be displayed on a moving map on a navigational display that identifies an area on a projected flight path where current significant weather events are projected to occur. The example graphic widget 120 includes a single bar 124 on one side of the projected flight path 122 that indicates the side of the flight path 122 on which a current significant weather event is projected to occur. The example graphic widget 120 also includes a double bar 126 with a bar on each side of the projected flight path 122 that indicates that the projected flight path 122 is projected to pass through an area experiencing a second current significant weather event. The example graphic widget 120 also includes a double bar 128 with a bar on each side of the double bar 126 that indicates that the projected flight path 122 is projected to pass through an area experiencing a third current significant weather event during part of the time the projected flight path 122 is projected to pass through an area experiencing the second current significant weather event.

The result visualization module 116 is also configured to generate a second graphic widget proximate to the first graphic widget that identifies the severity of the current significant weather phenomena associated with the first graphic widget, wherein the second widget is selectable and when selected the weather advisory system is configured to provide more detailed information regarding the current significant weather phenomena.

Figure 3:
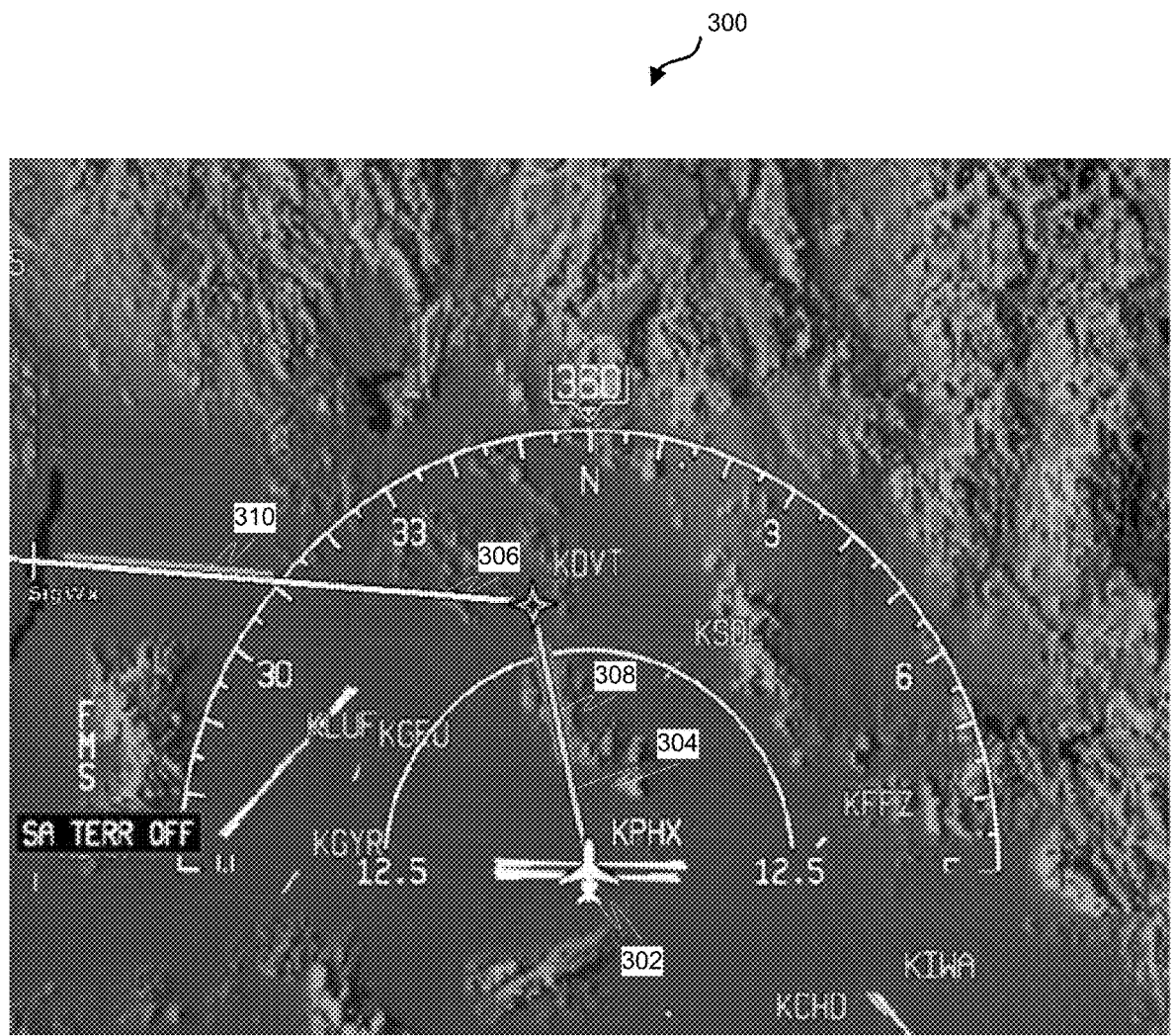
FIG. 3 is a diagram depicting an example moving map on a navigational display, in accordance with some embodiments.
Figure 4:
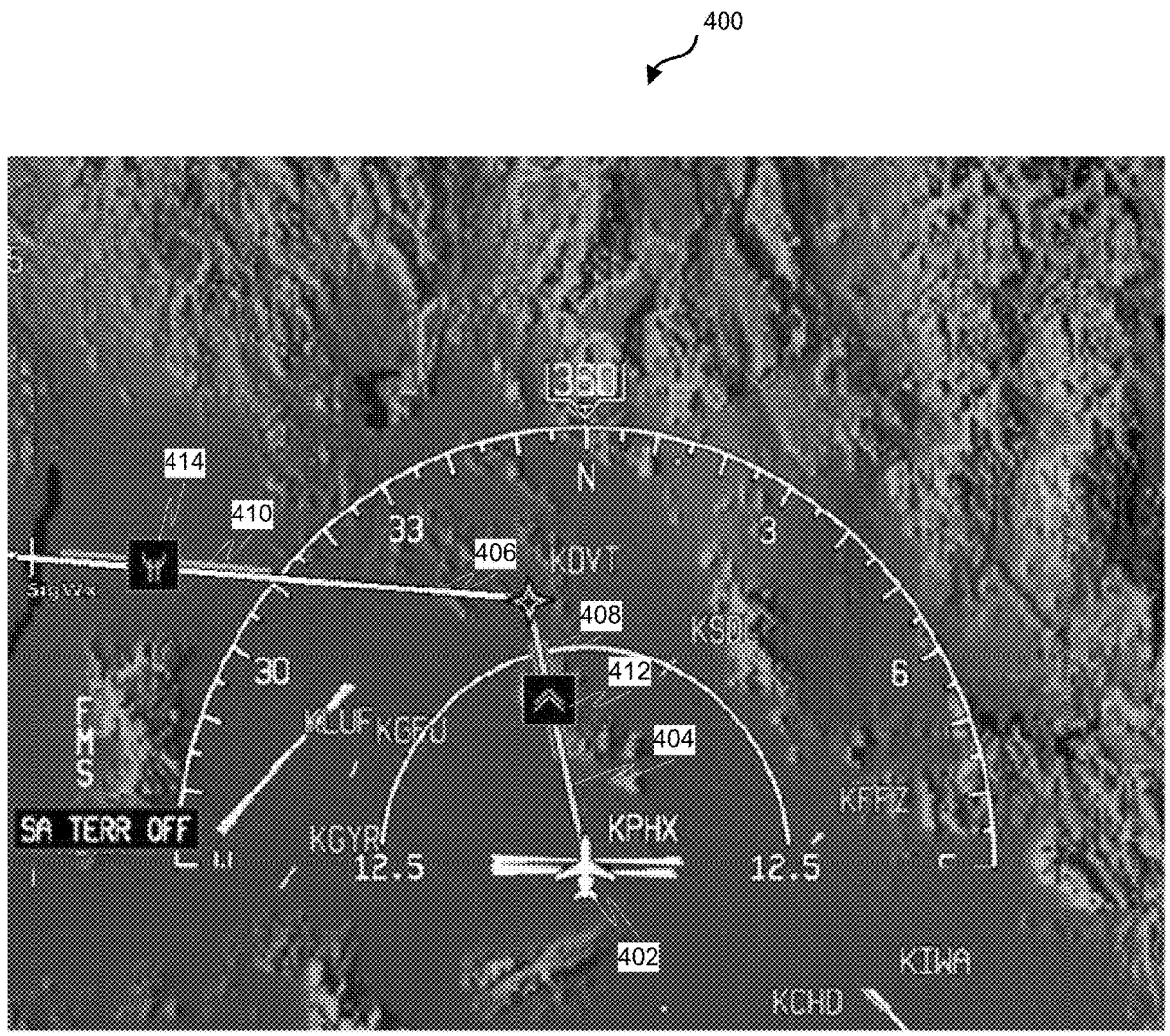
FIG. 4 is a diagram depicting another example moving map on a navigational display, in accordance with some embodiments.

FIG. 3 is a diagram depicting an example moving map 300 on a navigational display. The example moving map 300 depicts an aircraft widget 302, example legs 304, 306 of the aircraft's projected flight path, double bars 308 indicating a significant weather event projected to occur along the projected flight leg 304, and a single bar widget 310 indicating that a significant weather event is projected to occur north of the second leg 306. The distance of relevant time validity of the weather information is depicted in form of a short line with a "SigWx" callout FIG. 4 is a diagram depicting an example moving map 400 on a navigational display. The example moving map 400 includes an aircraft widget 402, example legs 404, 406 of the aircraft's projected flight path, double bars 408 indicating a significant weather event projected to occur along the projected flight leg 404, and a single bar widget 410 indicating that a significant weather event is projected to occur north of the second leg 406. The example moving map 400 also includes a first widget symbol 412 representing the first significant weather event. The first widget symbol 412 can be representative of a certain type of significant weather event, such as moderate turbulence in this example. The example moving map 400 further includes a second widget symbol 414 representing the second significant weather event. The second widget symbol 414 can be representative of a certain type of significant weather event, such as moderate icing in this example. Selection of the first widget symbol 412 or the second widget symbol 414 leads to opening a menu from which the flight crew can select detailed information regarding the significant weather event.

Figure 5:
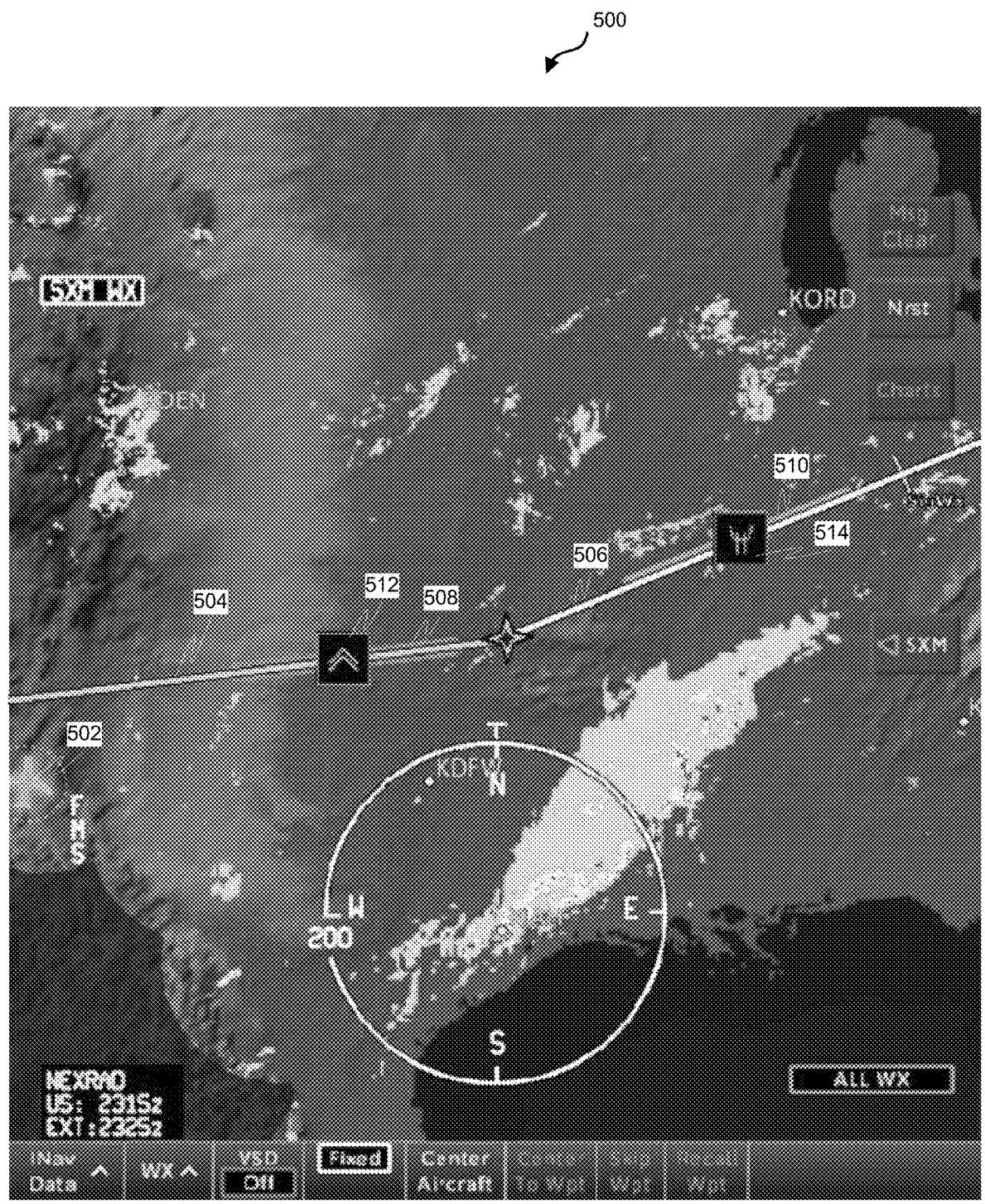
FIG. 5 is a diagram depicting another example moving map on a navigational display, in accordance with some embodiments.

FIG. 5 is a diagram depicting an example moving map 500, in a radar enhancement mode, on a navigational display. The example moving map 500 includes the depiction of a ground radar weather product (e.g. Nexrad). This provides the flight crew with a combination of the most frequently used weather information provided in full detail and the subtle depiction of significant weather impact that does not cause display clutter and allows the flight crew to inspect detailed weather information when desired.

The example moving map 500 includes an aircraft widget 502, example legs 504, 506 of the aircraft's projected flight path, double bars 508 indicating a first significant weather event projected to occur along the first projected flight leg 504, and a single bar widget 510 indicating that a second significant weather event is projected to occur north of the second leg 506. The example moving map 500 also includes a first widget symbol 512 representing the first significant weather event. The first widget symbol 512 can be representative of a certain type of significant weather event, such as moderate turbulence in this example. The example moving map 500 further includes a second widget symbol 514 representing the second significant weather event. The second widget symbol 514 can be representative of a certain type of significant weather event, such as moderate icing in this example. Selection of the first widget symbol 512 or the second widget symbol 514 leads to opening a menu from which the flight crew can select detailed information regarding the significant weather event.

Figure 6:
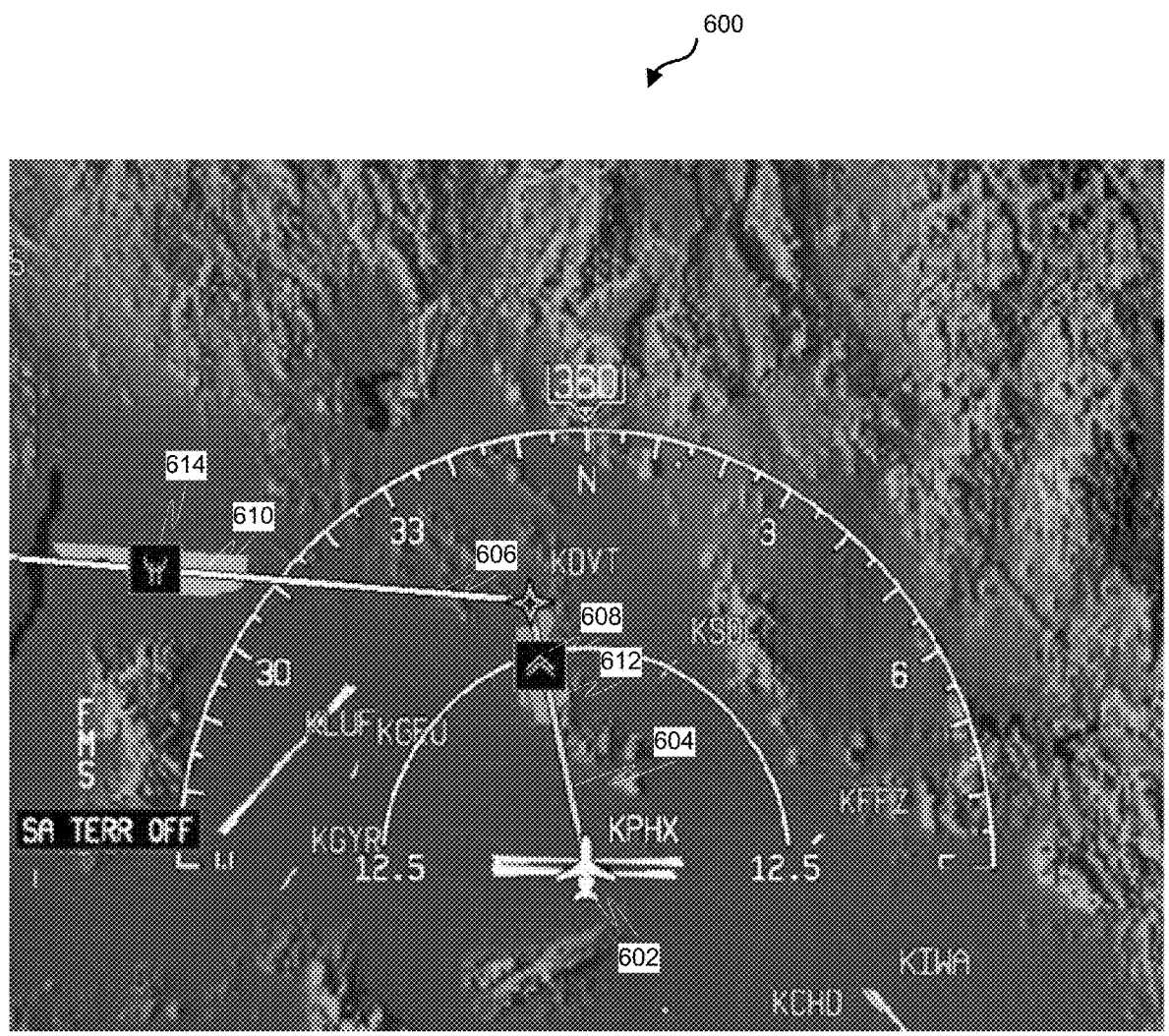
FIG. 6 is a diagram depicting another example moving map on a navigational display, in accordance with some embodiments.

FIG. 6 is a diagram depicting an example moving map 600 on a navigational display. The example moving map 600 includes an aircraft widget 602, example legs 604, 606 of the aircraft's projected flight path, shaped double bars 608 indicating a first significant weather event projected to occur along the first projected flight leg 604, and a shaped bar widget 610 indicating that a second significant weather event is projected to occur along the second leg 606. The example moving map 600 also includes a first widget symbol 612 representing the first significant weather event. The first widget symbol 612 can be representative of a certain type of significant weather event, such as moderate turbulence in this example. The example moving map 600 further includes a second widget symbol 614 representing the second significant weather event. The second widget symbol 614 can be representative of a certain type of significant weather event, such as moderate icing in this example. Selection of the first widget symbol 612 or the second widget symbol 614 leads to opening a menu from which the flight crew can select detailed information regarding the significant weather event. The example moving map 600 shows more detailed significant weather data including a shape of the area affected by the significant weather within the defined proximity corridor.

Figure 7:
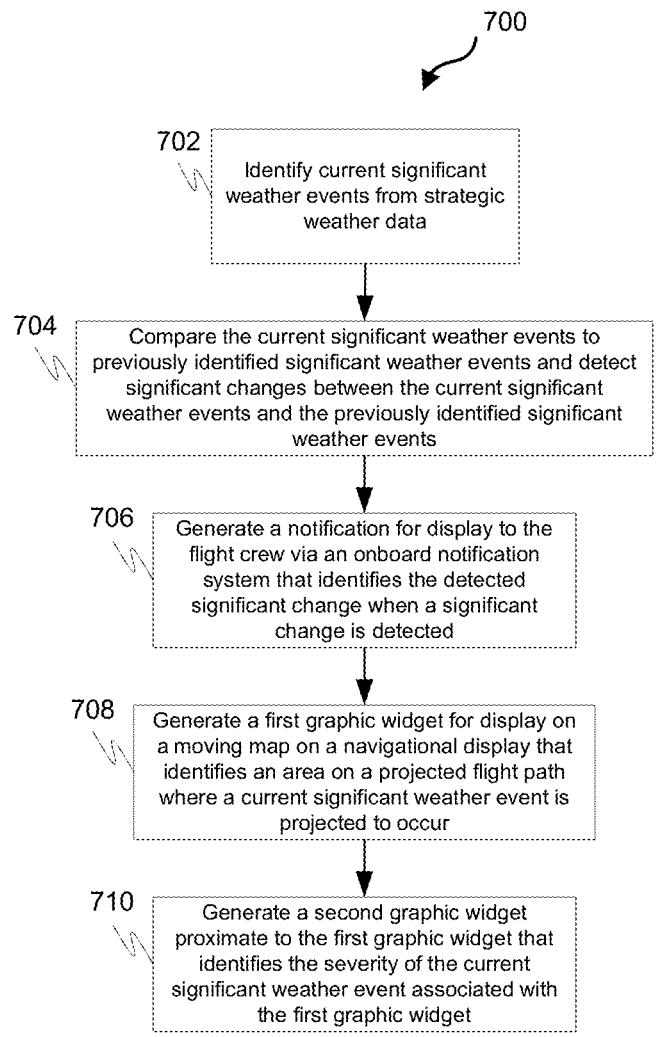
FIG. 7 is a process flow chart depicting an example process in an aircraft for generating weather advisories for a flight crew, in accordance with some embodiments.

FIG. 7 is a process flow chart depicting an example process 700 in an aircraft for generating weather advisories for a flight crew. The order of operation within the process 700 is not limited to the sequential execution as illustrated in the figure, but may be performed in one or more varying orders as applicable and in accordance with the present disclosure.

The example process 700 includes identifying, with a processor from strategic weather data, current significant weather events current significant weather events from weather impacted areas projected to be intersected by a geographical corridor around a projected flight path and projected to occur during determined time intervals during which the airborne vehicle is expected to pass through the weather impacted areas (operation 702). Identifying the current significant weather may include: filtering out, with the processor from the current significant weather events, potentially significant weather events from a weather impacted area that will not be intersected by a geographical corridor around a projected flight path and; filtering out, with the processor from the current significant weather events, potentially significant weather events that will not exist within the time frame during which the aircraft is planned to pass through the weather impacted area. Identifying the current significant weather may include: applying fixed predetermined criteria to automatically identify significant weather data; applying pre-designated flight crew preferences to automatically identify significant weather data; identifying, based on the status of one or more aircraft systems, significant weather data that is significant because of the status of the one or more aircraft systems; identifying significant weather data that is significant because it impacts projected take-off conditions; and identifying significant weather data that is significant because it impacts projected landing conditions.

The example process 700 includes comparing, with the processor, the current significant weather events to previously identified significant weather events and detect significant changes between the current significant weather events and the previously identified significant weather events (operation 704) and generating, with the processor, a notification for display to the flight crew via an onboard notification system that identifies the detected significant change when a significant change is detected (operation 706). The notification may include the type of weather phenomenon occurrence, level of the weather phenomenon occurrence, estimated time to reach the affected location, and a selectable link for providing more detailed information regarding the weather phenomenon occurrence when selected.

The example process 700 includes generating a first graphic widget for display on a moving map on a navigational display that identifies an area on a projected flight path where a current significant weather event is projected to occur (operation 708). The first graphic widget may include a single bar on one side of the projected flight path that indicates the side of the flight path on which the current significant weather event is projected to occur or a double bar with a bar on each side of the projected flight path that indicates that the projected flight path is projected to pass through an area experiencing the current significant weather event.

The example process 700 includes generating a second graphic widget proximate to the first graphic widget that identifies the severity of the current significant weather event associated with the first graphic widget (operation 710). The second widget is selectable and when selected more detailed information regarding the current significant weather event is provided.

Described herein are apparatus, systems, techniques and articles for assisting flight crew with the review of strategic weather data by providing the flight crew with summary information regarding the most significant properties of the overall weather situation and a way for the flight crew to access and efficiently review related weather details. The apparatus, systems, techniques and articles provided herein can provide a system that can identify significant weather, assess the impact of the significant weather on flight trajectory, provide a notification to the flight crew regarding the significant weather, and provide a graphical visualization of the significant weather's impact on flight trajectory.

In one embodiment, a weather advisory system in an airborne vehicle is provided. The system comprises one or more processors configured by programming instructions on non-transient computer readable media. The system is configured to identify, from strategic weather data, current significant weather events from weather impacted areas projected to be intersected by a geographical corridor around a projected flight path and projected to occur during determined time intervals during which the airborne vehicle is expected to pass through the weather impacted areas; and generate a notification for display to the flight crew via an onboard notification system that notifies the flight crew of an identified significant weather event.

These aspects and other embodiments may include one or more of the following features. The system may be further configured to generate a first graphic widget for display on a moving map on a navigational display that identifies an area on a projected flight path where a current significant weather event is projected to occur. The first graphic widget may comprise a single bar on one side of the projected flight path that indicates the side of the flight path on which the current significant weather event is projected to occur or a double bar with a bar on each side of the projected flight path that indicates that the projected flight path is projected to pass through an area experiencing the current significant weather event. The first graphic widget may also be selectable with two levels of interaction, wherein hovering over the first graphic widget causes a small area of significant weather that caused the occurrence of the first graphic widget to be displayed and clicking on the first graphic widget causes the display of detailed weather information regarding the significant weather that caused the occurrence of the first graphic widget. The system may be further configured to generate a second graphic widget proximate to the first graphic widget that identifies the severity of the current significant weather event associated with the first graphic widget. The second graphic widget may be selectable and when selected the weather advisory system is configured to provide more detailed information regarding the current significant weather event. To identify the current significant weather events, the system may be configured to apply fixed predetermined criteria to automatically identify significant weather data. To identify the current significant weather events, the system may be further configured to apply pre-designated flight crew preferences to automatically identify significant weather data. To identify the current significant weather events, the system may be further configured to identify, based on the status of one or more aircraft systems, significant weather data that is significant because of the status of the one or more aircraft systems. To identify the current significant weather events, the system may be further configured to identify significant weather data that is significant because it impacts projected take-off conditions. To identify the current significant weather events, the system may be further configured to identify significant weather data that is significant because it impacts projected landing conditions. The notification may include the type of weather phenomenon occurrence, level of the weather phenomenon occurrence, estimated time to reach the affected location, and a selectable link for providing more detailed information regarding the weather phenomenon occurrence when selected. To generate a notification, the system may be further configured to: compare the current significant weather events to previously identified significant weather events and detect significant changes between the current significant weather events and the previously identified significant weather events; and generate, when a significant change is detected, a notification that notifies the flight crew of the detected significant change.

In another embodiment, a processor implemented method in an aircraft for generating weather advisories for a flight crew is provided. The method comprises: identifying, with a processor from strategic weather data, current significant weather events from weather impacted areas projected to be intersected by a geographical corridor around a projected flight path and projected to occur during determined time intervals during which the aircraft is expected to pass through the weather impacted areas; and generating, with the processor, a notification for display to the flight crew via an onboard notification system that notifies the flight crew of an identified significant weather event.

These aspects and other embodiments may include one or more of the following features. The method may further comprise generating a first graphic widget for display on a moving map on a navigational display that identifies an area on a projected flight path where a current significant weather event is projected to occur. The first graphic widget may comprise a single bar on one side of the projected flight path that indicates the side of the flight path on which the current significant weather event is projected to occur or a double bar with a bar on each side of the projected flight path that indicates that the projected flight path is projected to pass through an area experiencing the current significant weather event. The method may further comprise generating a second graphic widget proximate to the first graphic widget that identifies the severity of the current significant weather event associated with the first graphic widget. The second graphic widget may be selectable and when selected more detailed information regarding the current significant weather event may be provided. The identifying the current significant weather may comprise applying fixed predetermined criteria to automatically identify significant weather data; applying pre-designated flight crew preferences to automatically identify significant weather data; identifying, based on the status of one or more aircraft systems, significant weather data that is significant because of the status of the one or more aircraft systems; identifying significant weather data that is significant because it impacts projected take-off conditions; and identifying significant weather data that is significant because it impacts projected landing conditions. The notification may include the type of weather phenomenon occurrence, level of the weather phenomenon occurrence, estimated time to reach the affected location, and a selectable link for providing more detailed information regarding the weather phenomenon occurrence when selected. Generating a notification may further comprise: comparing the current significant weather events to previously identified significant weather events and detecting significant changes between the current significant weather events and the previously identified significant weather events; and generating, when a significant change is detected, a notification that notifies the flight crew of the detected significant change.

In another embodiment, an airborne vehicle comprising a weather advisory system is provided. The weather advisory system comprises one or more processors configured by programming instructions on non-transient computer readable media. The weather advisory system is configured to: identify, from strategic weather data, current significant weather events from weather impacted areas projected to be intersected by a geographical corridor around a projected flight path and projected to occur during determined time intervals during which the airborne vehicle is expected to pass through the weather impacted areas; compare the current significant weather events to previously identified significant weather events and detect significant changes between the current significant weather events and the previously identified significant weather events; generate a notification for display to the flight crew via an onboard notification system that identifies the detected significant change when a significant change is detected, the notification including the type of weather phenomenon occurrence, level of the weather phenomenon occurrence, estimated time to reach the affected location, and a selectable link for providing more detailed information regarding the weather phenomenon occurrence when selected; and generate a first graphic widget for display on a moving map on a navigational display that identifies an area on a projected flight path where a current significant weather event is projected to occur, the first graphic widget comprising a single bar on one side of the projected flight path that indicates the side of the flight path on which the current significant weather event is projected to occur or a double bar with a bar on each side of the projected flight path that indicates that the projected flight path is projected to pass through an area experiencing the current significant weather event.

These aspects and other embodiments may include one or more of the following features. To identify the current significant weather events, the weather advisory system may be configured to: apply fixed predetermined criteria to automatically identify significant weather data; apply pre-designated flight crew preferences to automatically identify significant weather data; identify, based on the status of one or more aircraft systems, significant weather data that is significant because of the status of the one or more aircraft systems; identify significant weather data that is significant because it impacts projected take-off conditions; and identify significant weather data that is significant because it impacts projected landing conditions; and the weather advisory system may be further configured to: generate a second graphic widget proximate to the first graphic widget that identifies the severity of the current significant weather event associated with the first graphic widget, the second widget being selectable wherein when selected the weather advisory system is configured to provide more detailed information regarding the current significant weather event.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A weather advisory system in an airborne vehicle, the system comprising a controller configured by programming instructions on non-transitory computer readable media, the system configured to:
   apply fixed predetermined criteria, pre-designated flight crew preferences, and aircraft system availability based criteria to select, from strategic weather data, current significant weather events from weather impacted areas projected to be intersected by a geographical corridor around a projected flight path and projected to occur during determined time intervals during which the airborne vehicle is expected to pass through the weather impacted areas, the current significant weather events comprising a subset of weather events from the strategic weather data that are selected based on the fixed predetermined criteria, pre-designated flight crew preferences, and aircraft system availability based criteria;

generate a notification for display to the flight crew via an onboard notification system that notifies the flight crew of a selected significant weather event; and generate a first graphic widget for display on a moving map on a navigational display that identifies an area on a projected flight path where a first current significant weather event is projected to occur, wherein the first graphic widget comprises: a first predetermined shape for placement on one side of the projected flight path that indicates the side of the flight path on which the first current significant weather event is projected to occur when the projected flight path does not pass through an area experiencing the first current significant weather event, or a second predetermined shape for placement on two sides of the projected flight path that indicates that the projected flight path is projected to pass through the area experiencing the first current significant weather event when the projected flight path does pass through the area experiencing the first current significant weather event.

2. The weather advisory system of claim 1, wherein the first predetermined shape comprises a single bar on one side of the projected flight path that indicates the side of the flight path on which the first current significant weather event is projected to occur and the second predetermined shape comprises double bars with a bar on each side of the projected flight path that indicates that the projected flight path is projected to pass through an area experiencing the first current significant weather event.

3. The weather advisory system of claim 1, further configured to:
generate a first selectable graphic widget proximate to the first graphic widget having a predetermined symbol that is associated with a predetermined type of significant weather event that identifies the type of significant weather event associated with the first graphic widget.

4. The weather advisory system of claim 3, wherein the first selectable graphic widget when selected causes the weather advisory system to provide more detailed information regarding the first current significant weather event.

5. The weather advisory system of claim 4, further configured to generate a second graphic widget for display on the moving map on the navigational display that identifies an area on the projected flight path where a second current significant weather event is projected to occur, wherein the second current significant weather event is a different type of significant weather event than the first significant weather event, wherein the second graphic widget comprises: the first predetermined shape for placement on one side of the projected flight path that indicates the side of the flight path on which the second current significant weather event is projected to occur when the projected flight path does not pass through an area experiencing the second current significant weather event, or the second predetermined shape for placement on two sides of the projected flight path that indicates that the projected flight path is projected to pass through the area experiencing the second current significant weather event when the projected flight path does pass through the area experiencing the second current significant weather event.

6. The weather advisory system of claim 5, further configured to generate a second selectable graphic widget proximate to the second graphic widget having a predetermined symbol that is associated with a predetermined type of significant weather event that identifies the type of significant weather event associated with the second graphic widget and that is different from the symbol of the first selectable graphic widget.

7. The weather advisory system of claim 6, wherein the second selectable graphic widget when selected causes the weather advisory system to provide more detailed information regarding the second current significant weather event.

8. The weather advisory system of claim 1, wherein the notification includes the type of weather phenomenon occurrence, level of the weather phenomenon occurrence, estimated time to reach the affected location, and a selectable link for providing more detailed information regarding the weather phenomenon occurrence when selected.

9. The weather advisory system of claim 1, wherein to generate a notification, the system is further configured to:
compare the current significant weather events to previously identified significant weather events and detect significant changes between the current significant weather events and the previously identified significant weather events; and
generate, when a significant change is detected, a notification that notifies the flight crew of the detected significant change.

10. A processor implemented method in an aircraft for generating weather advisories for a flight crew, the method comprising:
applying fixed predetermined criteria, pre-designated flight crew preferences, and aircraft system availability based criteria to select, with a processor from strategic weather data, current significant weather events from weather impacted areas projected to be intersected by a geographical corridor around a projected flight path and projected to occur during determined time intervals during which the aircraft is expected to pass through the weather impacted areas, the current significant weather events comprising a subset of weather events from the strategic weather data that are selected based on the fixed predetermined criteria, pre-designated flight crew preferences, and aircraft system availability based criteria;
generating, with the processor, a notification for display to the flight crew via an onboard notification system that notifies the flight crew of a selected significant weather event; and
generating a first graphic widget for display on a moving map on a navigational display that identifies an area on a projected flight path where a first current significant weather event is projected to occur, wherein the first graphic widget comprises: a first predetermined shape for placement on one side of the projected flight path that indicates the side of the flight path on which the first current significant weather event is projected to occur when the projected flight path does not pass through an area experiencing the first current significant weather event, or a second predetermined shape for placement on two sides of the projected flight path that indicates that the projected flight path is projected to pass through the area experiencing the first current significant weather event when the projected flight path does pass through the area experiencing the first current significant weather event.

11. The method of claim 10, wherein the first predetermined shape comprises a single bar on one side of the projected flight path that indicates the side of the flight path on which the first current significant weather event is projected to occur and the second predetermined shape comprises double bars with a bar on each side of the projected flight path that indicates that the projected flight path is projected to pass through an area experiencing the first current significant weather event.

12. The method of claim 11, further comprising generating a first selectable graphic widget proximate to the first graphic widget having a predetermined symbol that is associated with a predetermined type of significant weather event that identifies the type of significant weather event associated with the first graphic widget, and wherein the first selectable graphic widget when selected causes more detailed information regarding the first current significant weather event to be provided.

13. The method of claim 12, further comprising generating a second graphic widget for display on the moving map on the navigational display that identifies an area on the projected flight path where a second current significant weather event is projected to occur, wherein the second current significant weather event is a different type of significant weather event than the first significant weather event, wherein the second graphic widget comprises: the first predetermined shape for placement on one side of the projected flight path that indicates the side of the flight path on which the second current significant weather event is projected to occur when the projected flight path does not pass through an area experiencing the second current significant weather event, or the second predetermined shape for placement on two sides of the projected flight path that indicates that the projected flight path is projected to pass through the area experiencing the second current significant weather event when the projected flight path does pass through the area experiencing the second current significant weather event.

14. The method of claim 13, further comprising generating a second selectable graphic widget proximate to the second graphic widget having a predetermined symbol that is associated with a predetermined type of significant weather event that identifies the type of significant weather event associated with the second graphic widget and that is different from the symbol of the first selectable graphic widget wherein the second selectable graphic widget when selected causes the weather advisory system to provide more detailed information regarding the second current significant weather event.

15. Non-transitory computer readable media encoded with programming instructions configurable to cause a processor in an aircraft to perform a method for generating weather advisories for a flight crew, the method comprising:
applying fixed predetermined criteria, pre-designated flight crew preferences, and aircraft system availability based criteria to select, from strategic weather data, current significant weather events from weather impacted areas projected to be intersected by a geographical corridor around a projected flight path and projected to occur during determined time intervals during which the aircraft is expected to pass through the weather impacted areas, the current significant weather events comprising a subset of weather events from the strategic weather data that are selected based on the fixed predetermined criteria, pre-designated flight crew preferences, and aircraft system availability based criteria;
generating a notification for display to the flight crew via an onboard notification system that notifies the flight crew of a selected significant weather event; and
generating a first graphic widget for display on a moving map on a navigational display that identifies an area on a projected flight path where a first current significant weather event is projected to occur, wherein the first graphic widget comprises: a first predetermined shape for placement on one side of the projected flight path that indicates the side of the flight path on which the first current significant weather event is projected to occur when the projected flight path does not pass through an area experiencing the first current significant weather event, or a second predetermined shape for placement on two sides of the projected flight path that indicates that the projected flight path is projected to pass through the area experiencing the first current significant weather event when the projected flight path does pass through the area experiencing the first current significant weather event.

16. The non-transitory computer readable media of claim 15, wherein:
the first graphic widget is selectable with two levels of interaction, wherein hovering over the first graphic widget causes a small area of significant weather that caused the occurrence of the first graphic widget to be displayed and clicking on the first graphic widget causes the display of detailed weather information regarding the significant weather that caused the occurrence of the first graphic widget.

17. The non-transitory computer readable media of claim 15, wherein the first predetermined shape comprises a single bar on one side of the projected flight path that indicates the side of the flight path on which the first current significant weather event is projected to occur and the second predetermined shape comprises double bars with a bar on each side of the projected flight path that indicates that the projected flight path is projected to pass through an area experiencing the first current significant weather event.

18. The non-transitory computer readable media of claim 17, wherein the method further comprises generating a first selectable graphic widget proximate to the first graphic widget having a predetermined symbol that is associated with a predetermined type of significant weather event that identifies the type of significant weather event associated with the first graphic widget, and wherein the first selectable graphic widget when selected causes more detailed information regarding the first current significant weather event to be provided.

19. The non-transitory computer readable media of claim 18, wherein the method further comprises generating a second graphic widget for display on the moving map on the navigational display that identifies an area on the projected flight path where a second current significant weather event is projected to occur, wherein the second current significant weather event is a different type of significant weather event than the first significant weather event, wherein the second graphic widget comprises: the first predetermined shape for placement on one side of the projected flight path that indicates the side of the flight path on which the second current significant weather event is projected to occur when the projected flight path does not pass through an area experiencing the second current significant weather event, or the second predetermined shape for placement on two sides of the projected flight path that indicates that the projected flight path is projected to pass through the area experiencing the second current significant weather event when the projected flight path does pass through the area experiencing the second current significant weather event.

20. The non-transitory computer readable media of claim 19, wherein the method further comprises generating a second selectable graphic widget proximate to the second graphic widget having a predetermined symbol that is associated with a predetermined type of significant weather event that identifies the type of significant weather event associated with the second graphic widget and that is different from the symbol of the first selectable graphic widget, wherein the second selectable graphic widget when selected causes the weather advisory system to provide more detailed information regarding the second current significant weather event.

* * * * *